United States Patent [19]
Yoshioka et al.

[11] Patent Number: 5,168,707
[45] Date of Patent: Dec. 8, 1992

[54] INTERNAL COMBUSTION ENGINE WITH A DUAL TURBOCHARGER SYSTEM

[75] Inventors: Mamoru Yoshioka, Susono; Toshihisa Sugiyama, Gotenba; Kunihiko Nakata, Susono; Yuuji Kantou, Susono; Toru Kidokoro, Susono, all of Japan

[73] Assignee: Toyota Jidosha Kabushiki Kaisha, Toyota, Japan

[21] Appl. No.: 616,185

[22] Filed: Nov. 20, 1990

[30] Foreign Application Priority Data

Nov. 21, 1989 [JP] Japan .................. 1-300873
Mar. 7, 1990 [JP] Japan ............... 2-22199[U]
Mar. 20, 1990 [JP] Japan ............... 2-27748[U]

[51] Int. Cl.⁵ .............................................. F02B 37/12
[52] U.S. Cl. ............................................ 60/612; 60/602
[58] Field of Search ............... 60/612, 600, 601, 602, 60/603, 611

[56] References Cited

U.S. PATENT DOCUMENTS

| | | | |
|---|---|---|---|
| 3,038,297 | 6/1962 | Kauffmann | 60/611 |
| 4,474,008 | 10/1984 | Sakurai | 60/611 |
| 4,781,027 | 11/1988 | Richter | 60/612 |
| 4,793,140 | 12/1988 | Esch | 60/612 |
| 4,982,567 | 3/1991 | Hashimoto et al. | 60/600 |
| 5,003,781 | 4/1991 | Shibata et al. | 60/600 |
| 5,005,359 | 4/1991 | Tashima et al. | 60/600 |
| 5,036,663 | 8/1991 | Akagi et al. | 60/612 |

FOREIGN PATENT DOCUMENTS

| | | |
|---|---|---|
| 334206 | 9/1989 | European Pat. Off. . |
| 60259722 | 12/1965 | Japan . |
| 50-118117 | 9/1975 | Japan . |
| 55-84816 | 6/1980 | Japan . |
| 59-145328 | 8/1984 | Japan . |
| 60-104718 | 6/1985 | Japan . |
| 60-169630 | 9/1985 | Japan . |
| 61-190121 | 8/1986 | Japan . |
| 1300016 | 12/1989 | Japan . |

Primary Examiner—Richard A. Bertsch
Assistant Examiner—Peter Korytnyk
Attorney, Agent, or Firm—Cushman, Darby & Cushman

[57] ABSTRACT

An internal combustion engine with a dual turbocharger system includes an engine, a first turbocharger and a second turbocharger arranged in parallel with each other, an intake switching valve located downstream of a compressor of the second turbocharger, and an exhaust switching valve located downstream of a turbine of the second turbocharger. At large intake air quantities, both turbochargers are operated, while at small to medium intake air quantities only the first turbocharger is operated. At "one-turbocharger-operation", when the engine load is low, the intake switching valve is opened, while the exhaust switching valve is maintained closed. Thus, at small to medium intake air quantities and low engine loads, the intake flow can be introduced through both the compressor of the first turbocharger and the compressor of the second turbocharger. As a result, flow resistance is decreased and acceleration response from low engine loads is improved.

23 Claims, 13 Drawing Sheets

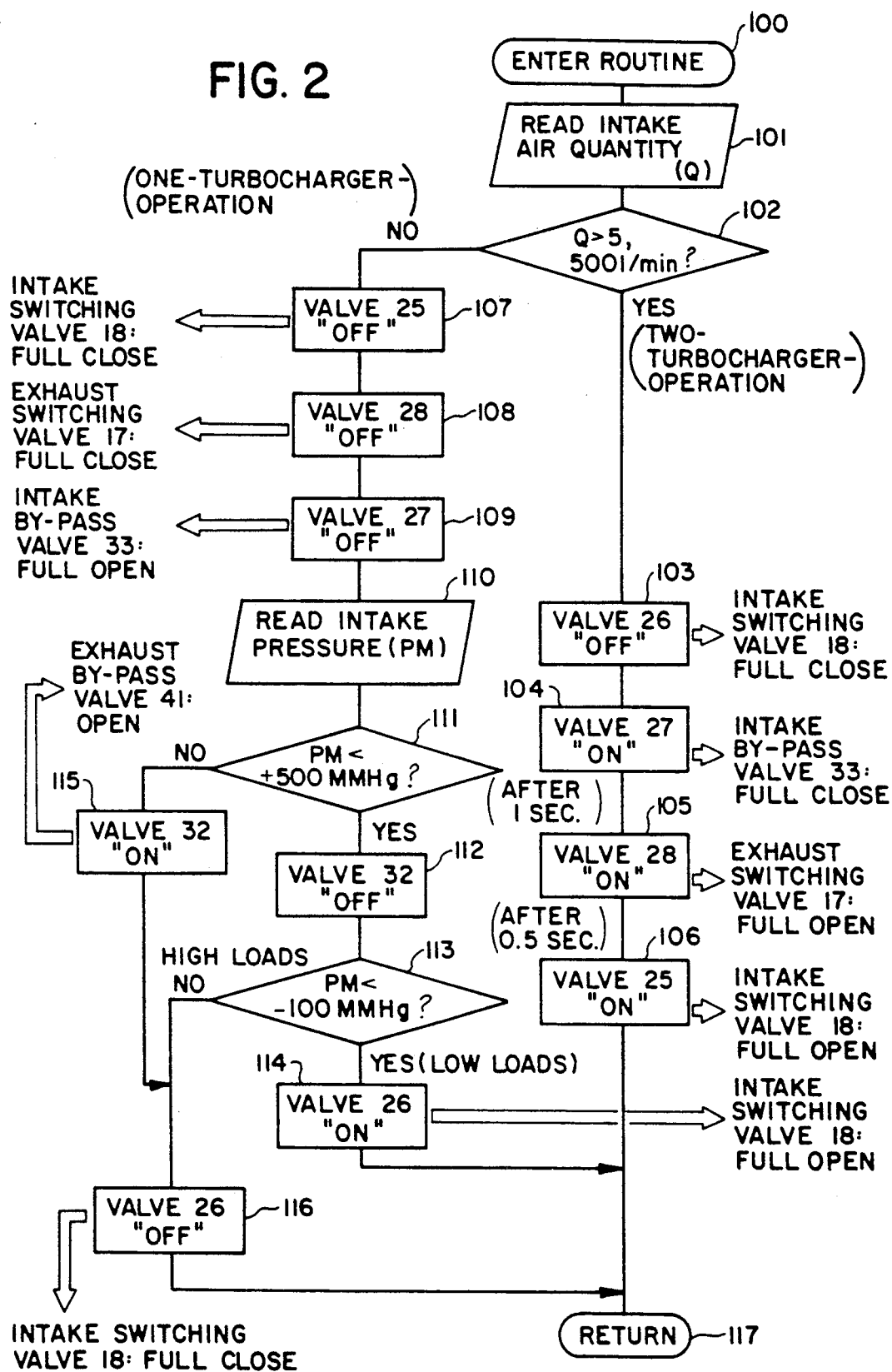

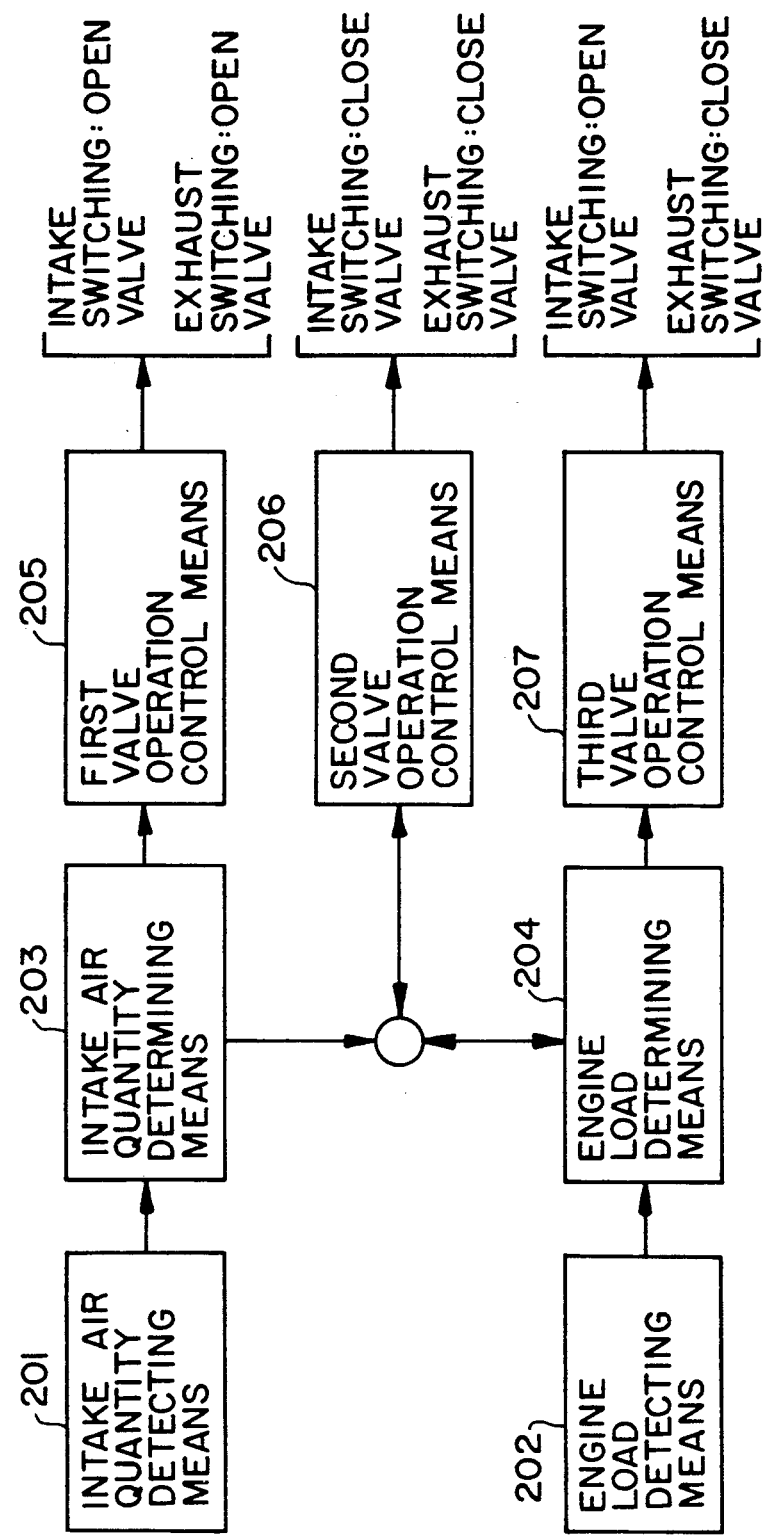

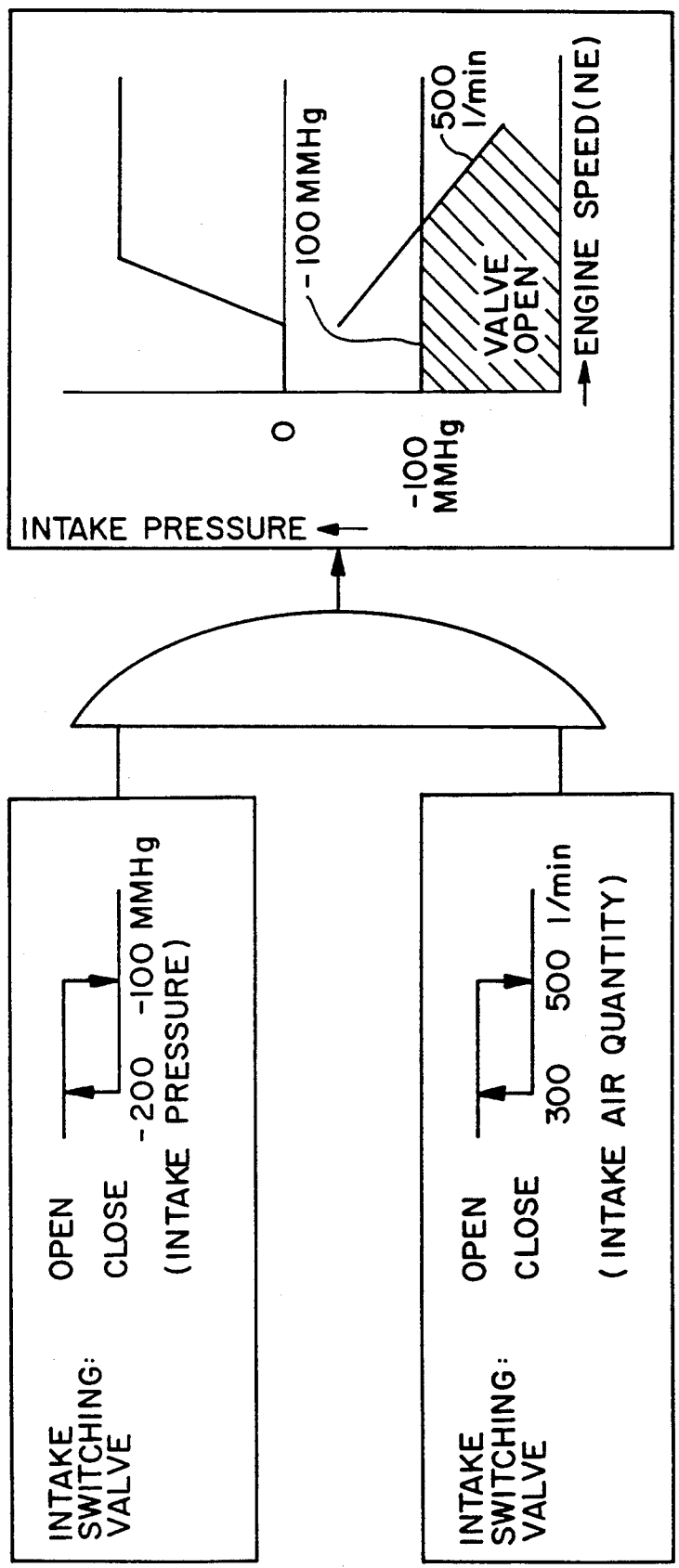

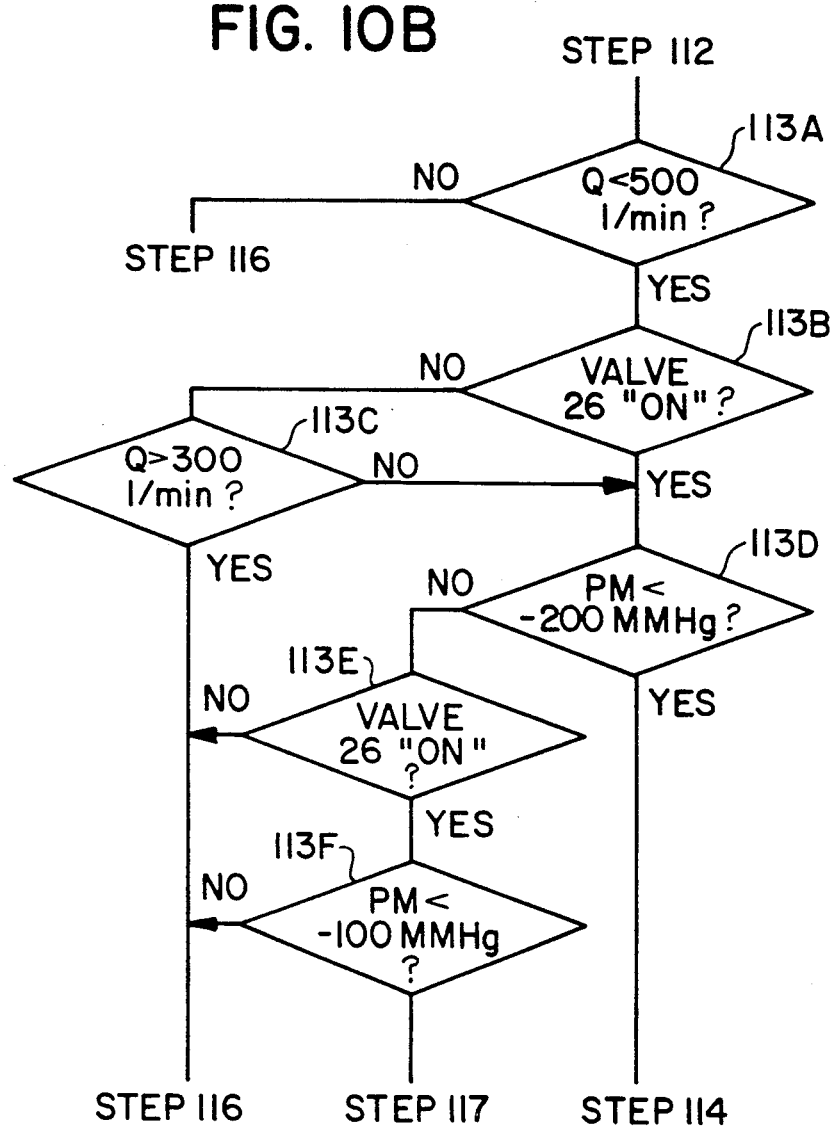

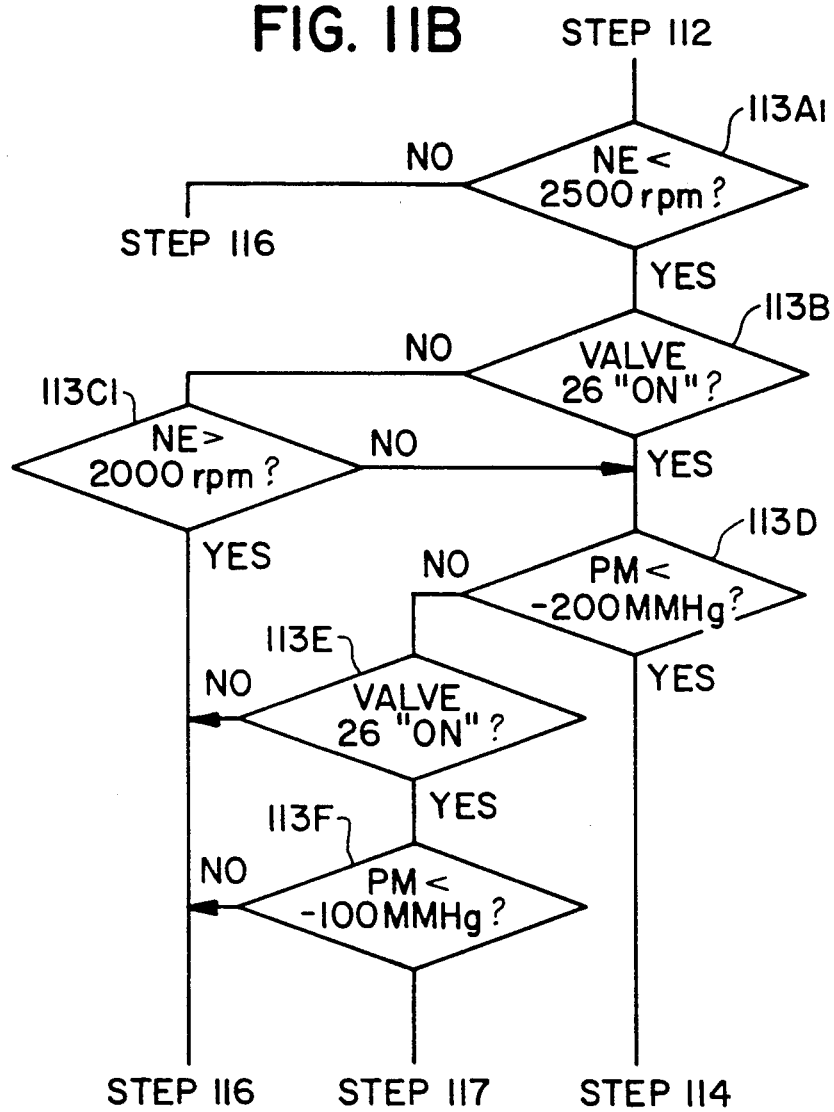

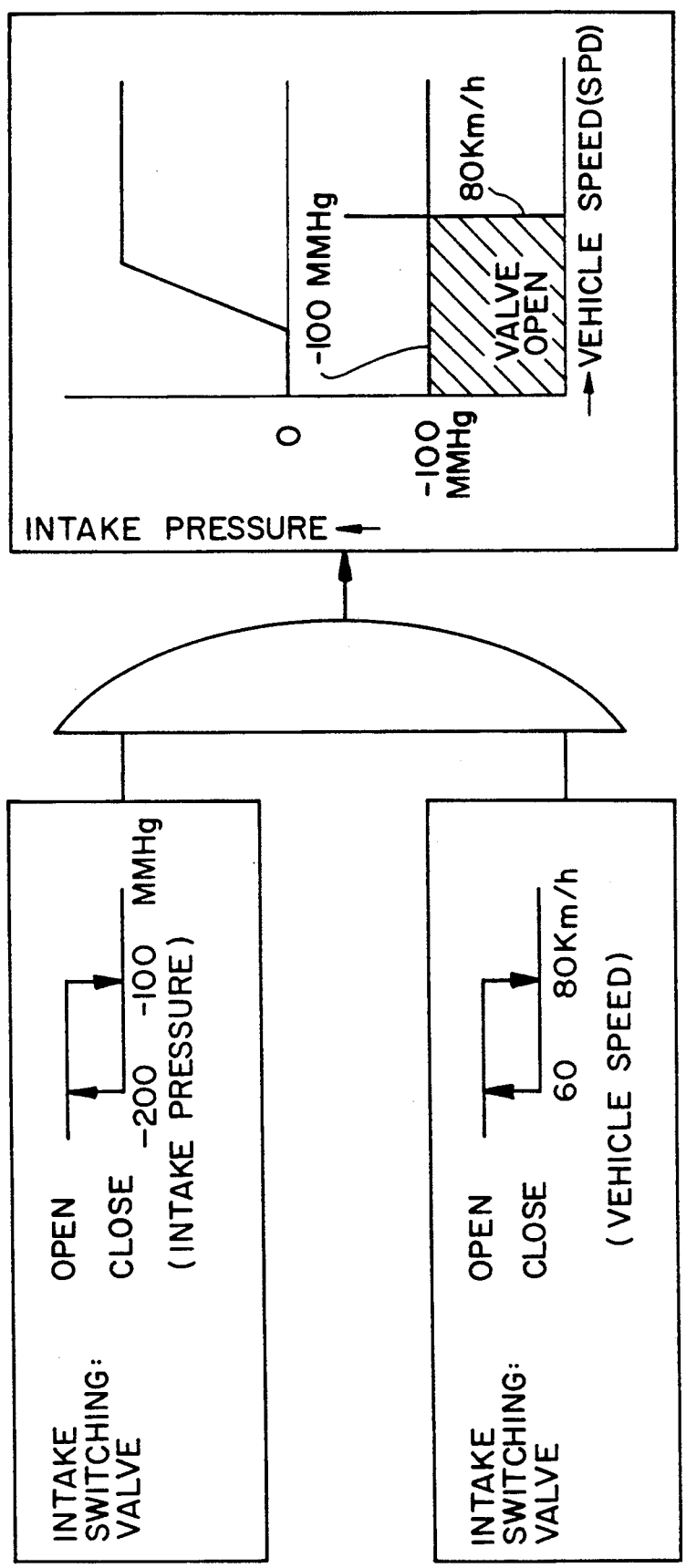

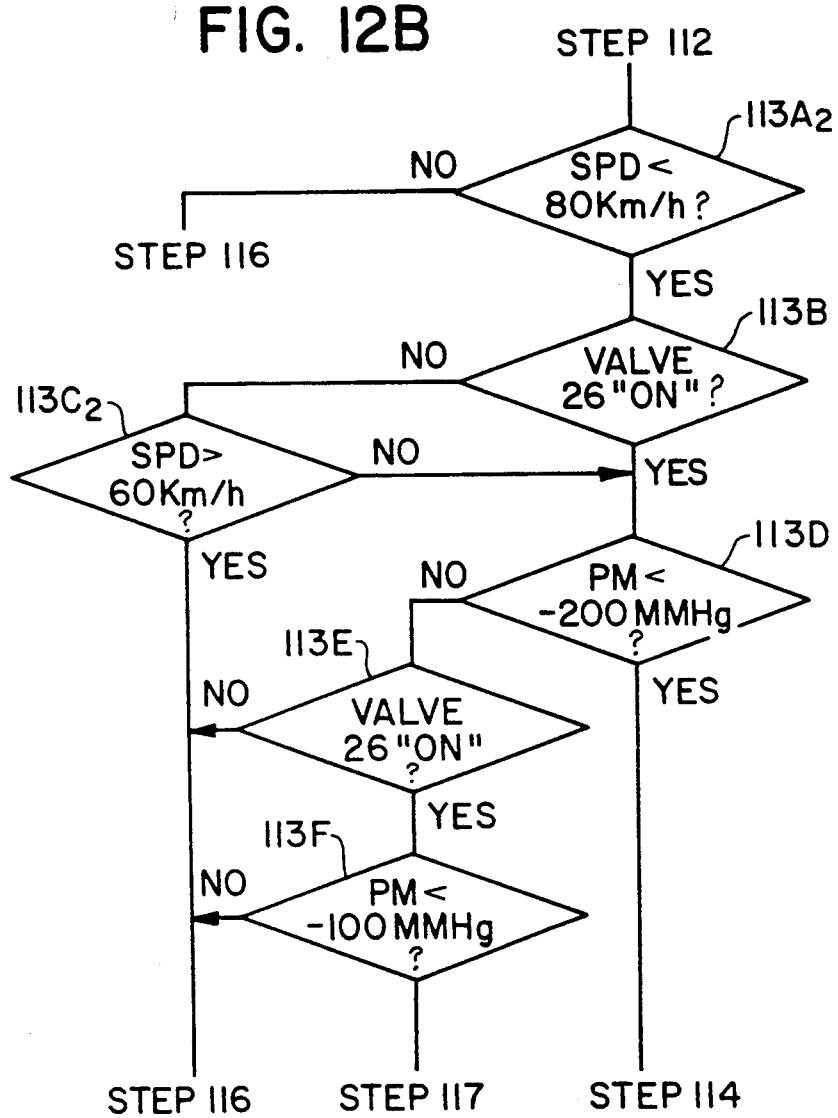

INTERNAL COMBUSTION ENGINE WITH A DUAL TURBOCHARGER SYSTEM

BACKGROUND OF THE INVENTION

1. Field of the Invention

The present relates to an internal combustion engine with a dual turbocharger system having a first turbocharger and a second turbocharger wherein air is charged to the engine by only the first turbocharger at small intake air quantities and is charged by both the first and the second turbochargers at large intake air quantities.

2. Description of the Prior Art

Internal combustion engines with a dual turbocharger system are known by, for example, Japanese Patent Publications SHO 61-112734 and SHO 59-145328, and Japanese Utility Model Publication SHO 62-167329.

As illustrated in FIG. 13 (Prior Art), a conventional turbocharged internal combustion engine 1' is provided with a first turbocharger 7' and a second turbocharger 8' having turbines 7a' and 8a', respectively, and compressors 7b' and 8b', respectively. In an exhaust conduit 20b' downstream of the turbine 8a', and exhaust switching valve 17' is installed. Similarly, in an intake conduit 14b' downstream of the compressor 8b', an intake switching valve 18' is installed. Further, in an intake by-pass conduit 13' by-passing the compressor 8b', an intake by-pass valve 33' is installed. The intake switching valve 18' and the exhaust switching valve 17' are closed at small to medium intake air quantities to produce "one-turbocharger operation" wherein only the first turbocharger 7' is operated. The intake switching valve 18' and the exhaust switching valve 17' are opened at large intake air quantities to produce "two-turbocharger operation" wherein both the first turbocharger 7' and the second turbocharger 8' are operated. To obtain a smooth transition from the "one-turbocharger-operation" to "two-turbocharger-operation", the exhaust switching valve 17' is partially opened to run-up the second turbocharger 8.

However, there is the following problem in the above-described conventional turbocharged engine. In the case where the intake switching valve 18' is closed from the beginning of acceleration, the intake flow is introduced to the engine only through the first turbocharger 7'. Therefore, in acceleration from low engine loads when the first turbocharger 7' is not yet rotating at sufficiently high speeds, the compressor impeller of the first turbocharger 7' caused a resistance for the intake flow, thereby degrading the response characteristic at the beginning of the acceleration.

BACKGROUND OF THE INVENTION

An object of the invention is to improve a response characteristic in acceleration from low engine loads of an internal combustion engine with a dual turbocharger system.

The above-described object can be attained by an internal combustion engine with a dual turbocharger system in accordance with the present invention. The engine includes a multi-cylinder internal combustion engine, a first turbocharger and a second turbocharger arranged in parallel with each other with respect to the engine, each including a turbine and a compressor driven by the turbine, an intake switching valve installed downstream of the compressor of the second turbocharger, an exhaust switching valve installed downstream of the turbine of the second turbocharger, intake switching valve operating means for opening the intake switching valve at large intake air quantities and at small to medium intake air quantities and low engine loads and closing the intake switching valve at small to medium intake air quantities and high engine loads; and exhaust switching valve operating means for opening the exhaust switching valve at large intake air quantities and closing the exhaust switching valve at small to medium intake air quantities.

In the above-described engine with a dual turbocharger system, even if the engine is accelerated from low engine loads at small to medium intake air quantities, the intake flow can be introduced to the engine through both the first turbocharger and the second turbocharger because the intake switching valve is opened at small to medium intake air quantities and low engine loads. Therefore, the compressor impeller of the second turbocharger does not cause a flow resistance. As a result, the acceleration response from low engine loads at small to medium intake air quantities is improved.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 2 is a flow chart illustrating an operation control of the internal combustion engine with a dual turbocharger system in accordance with the first embodiment of the present invention, the steps of FIG. 2 except steps 106, 107 and 113 being applicable to all other embodiments of the present invention;

FIG. 3 is a diagram illustrating general control of the internal combustion engine in accordance with first through fourth embodiments of the present invention;

FIG. 10A is a block diagram illustrating a relationship between an intake switching valve opening range and parameters of intake pressure and intake air quantity, of an internal combustion engine with a dual turbocharger system in accordance with a fifth embodiment of the present invention;

FIG. 10B is a partial flow chart illustrating a control for opening an intake switching valve during "one-turbocharger-operation" in accordance with the fifth embodiment;

FIG. 11B is a partial flow chart illustrating a control for opening an intake switching valve during "one-turbocharger-operation" in accordance with the sixth embodiment;

FIG. 12A is a block diagram illustrating a relationship between an intake switching valve opening range and parameters of intake pressure and vehicle speed, of an internal combustion engine with a dual turbocharger system in accordance with a seventh embodiment of the present invention;

FIG. 12B is a partial flow chart illustrating a control for opening an intake switching valve during "one-turbocharger-operation" in accordance with the seventh embodiment.

DETAILED DESCRIPTION OF THE PREFERRED EMBODIMENTS

Figure 1:
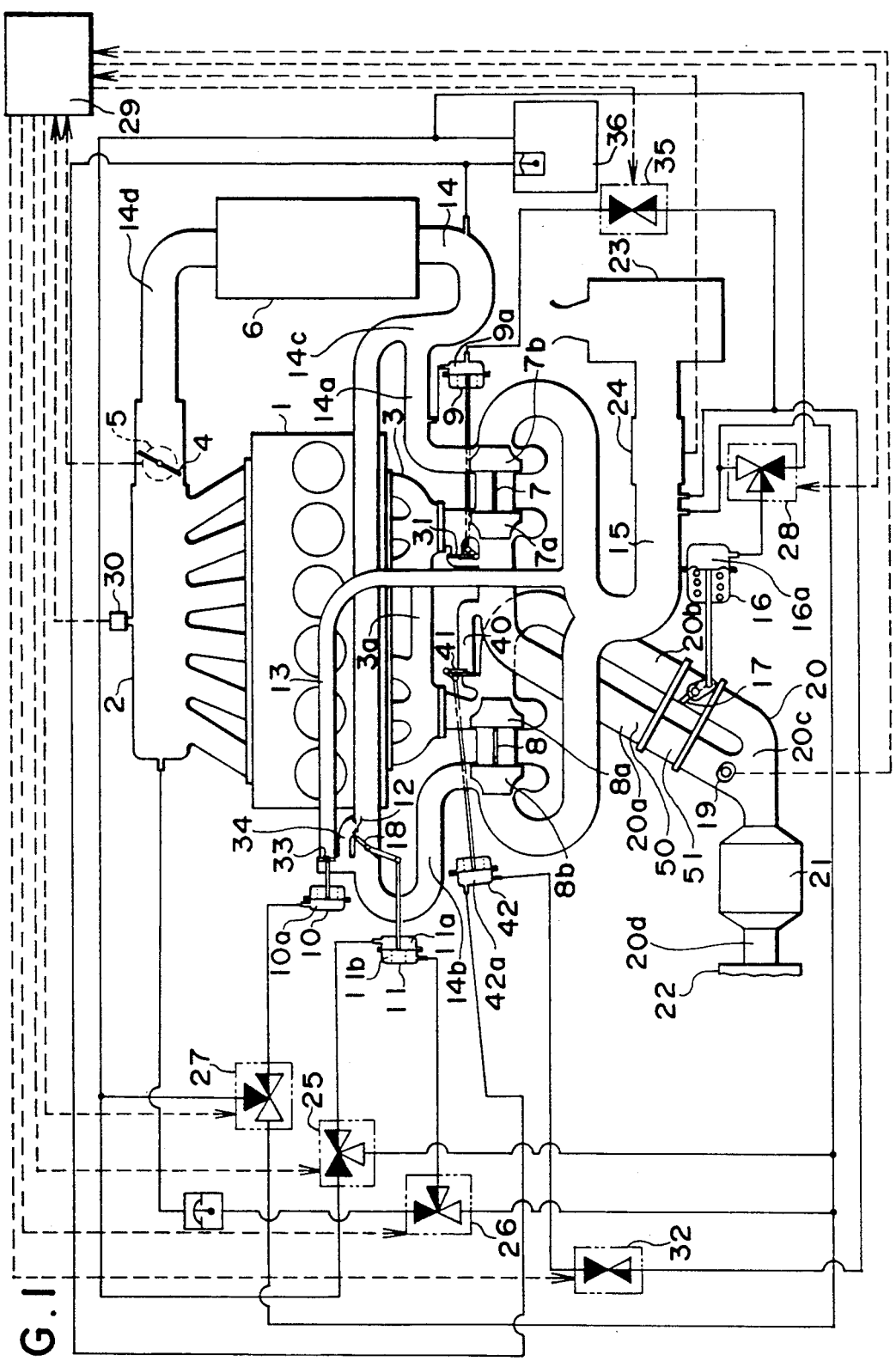
FIG. 1 is a schematic view of an internal combustion engine with a dual turbocharger system in accordance with a first embodiment of the present invention, the structures of FIG. 1 except an intake switching valve, an actuator coupled to the intake switching valve, and solenoid valves for operating the actuator being applicable to all other embodiments of the present invention.
Figure 4A:
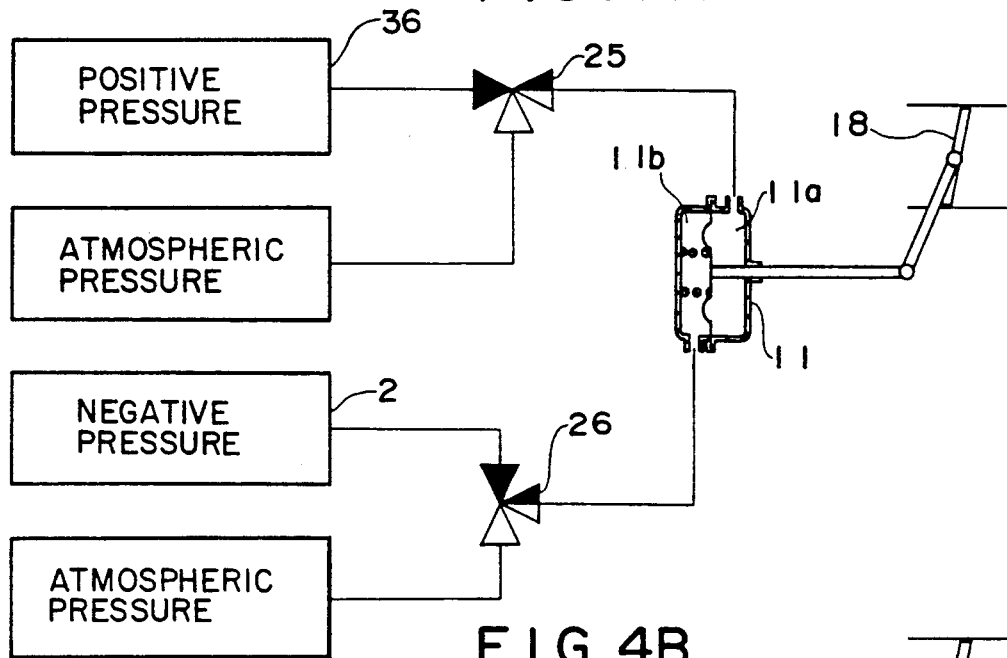
FIG. 4A is a partial view of FIG. 1, more particularly, a schematic view of the intake switching valve and the members located in the vicinity of the intake switching valve of the engine with a dual turbocharger system in accordance with the first embodiment.
Figure 4B:
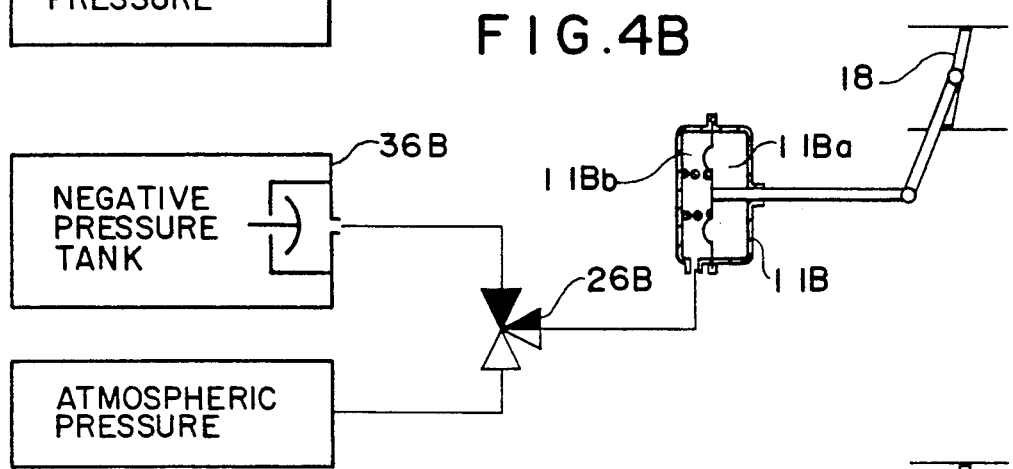
FIG. 4B is a schematic view of an intake switching valve and the members located in the vicinity of the intake switching valve of an internal combustion engine with a dual turbocharger system in accordance with a second embodiment of the present invention.
Figure 4C:
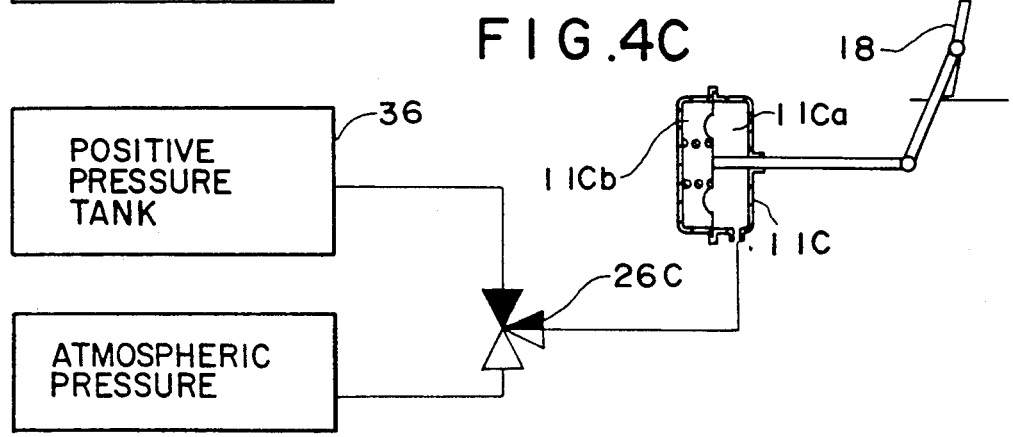
FIG. 4C is a schematic view of an intake switching valve and the members located in the vicinity of the intake switching valve of an internal combustion engine with a dual turbocharger system in accordance with a third embodiment of the present invention.
Figure 7:
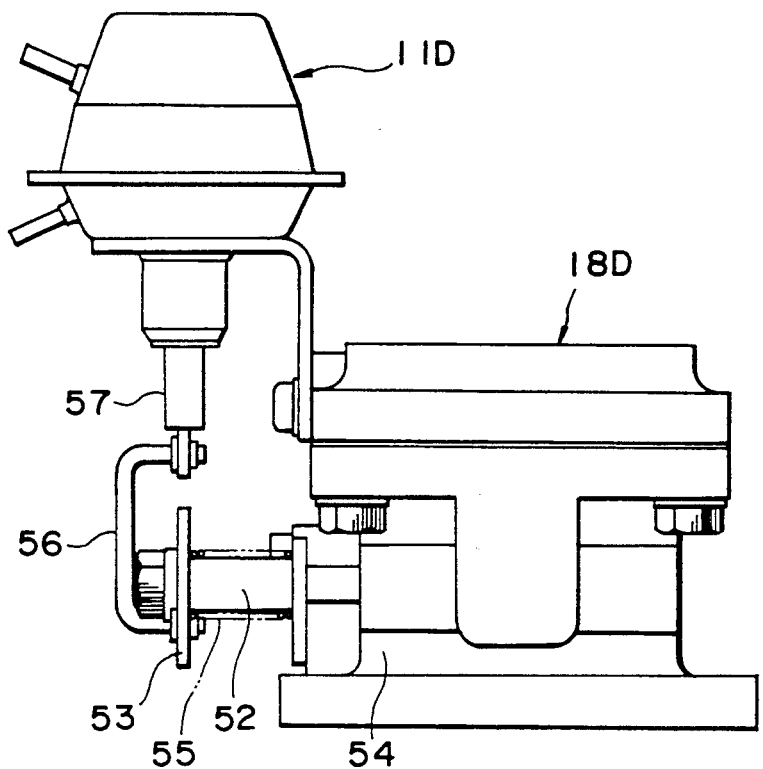
FIG. 7 is a front elevational view of a swing arm-type intake switching valve for use in an internal combustion engine with a dual turbocharger system in accordance with a fourth embodiment of the present invention.
Figure 8:
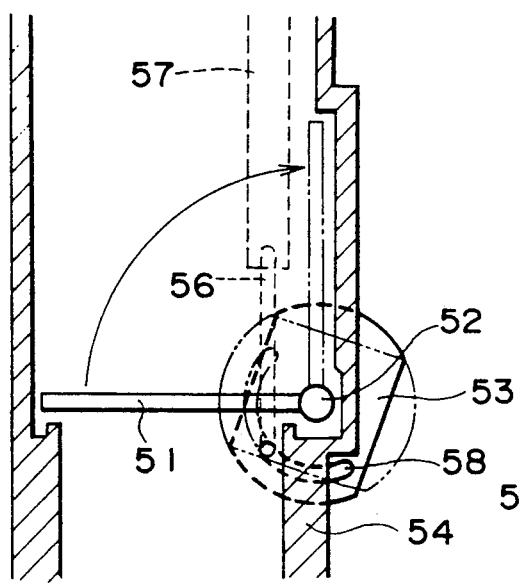
FIG. 8 is a cross-sectional view of the intake switching valve of FIG. 7 illustrating an opening and closing operation of the intake switching valve.
Figure 9:
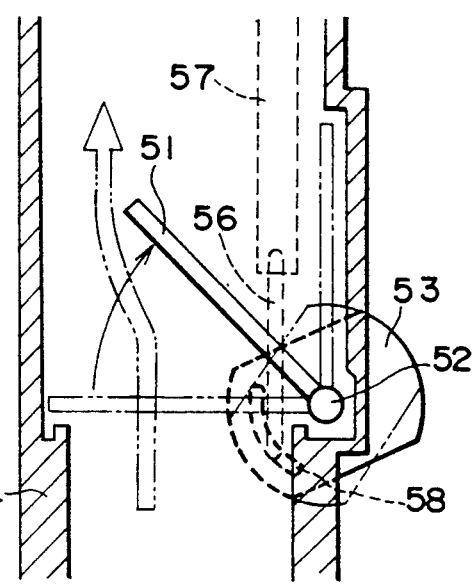
FIG. 9 is a cross-sectional view of the intake switching valve of FIG. 7 illustrating a one-way valve function provided to the intake switching valve.
Figure 11A:
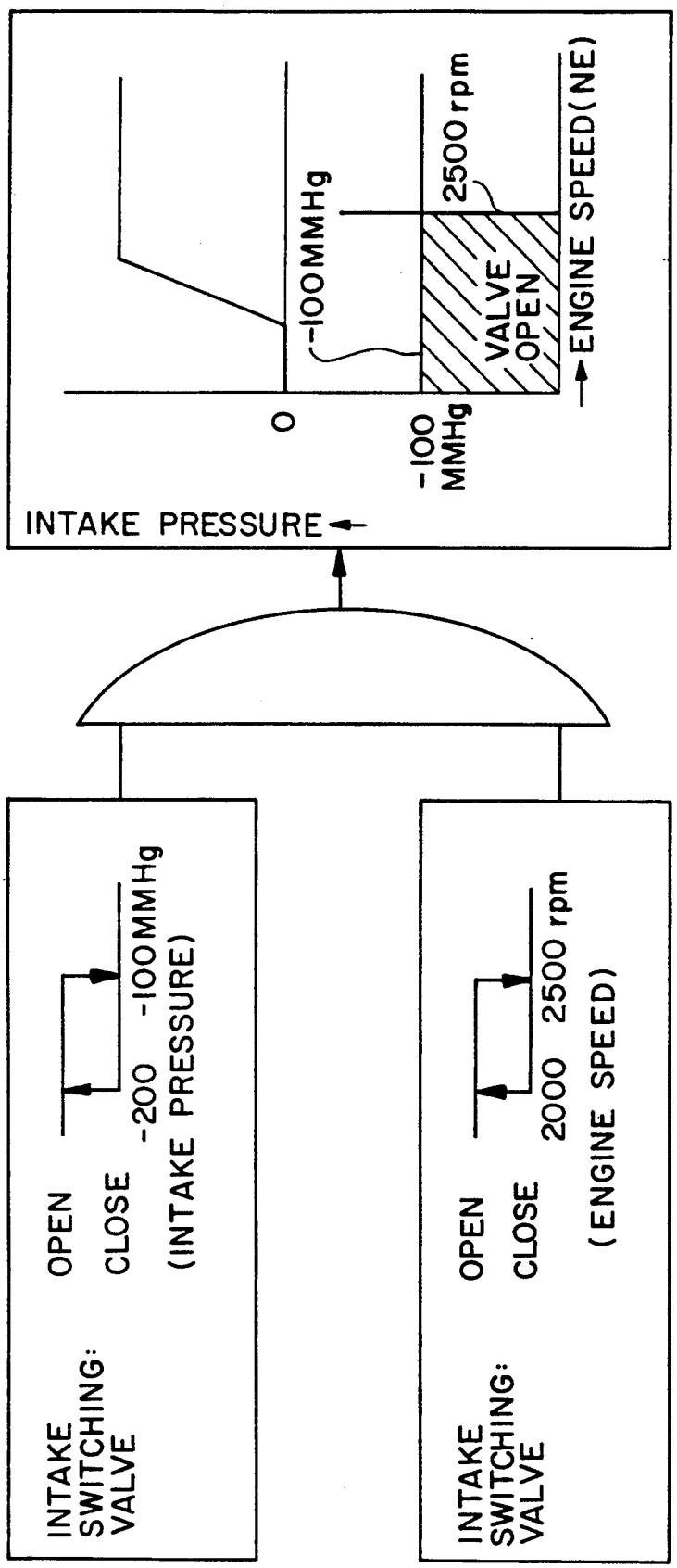
FIG. 11A is a block diagram illustrating a relationship between an intake switching valve opening range and parameters of intake pressure and engine speed, of an internal combustion engine with a dual turbocharger system in accordance with a sixth embodiment of the present invention.
Figure 13:
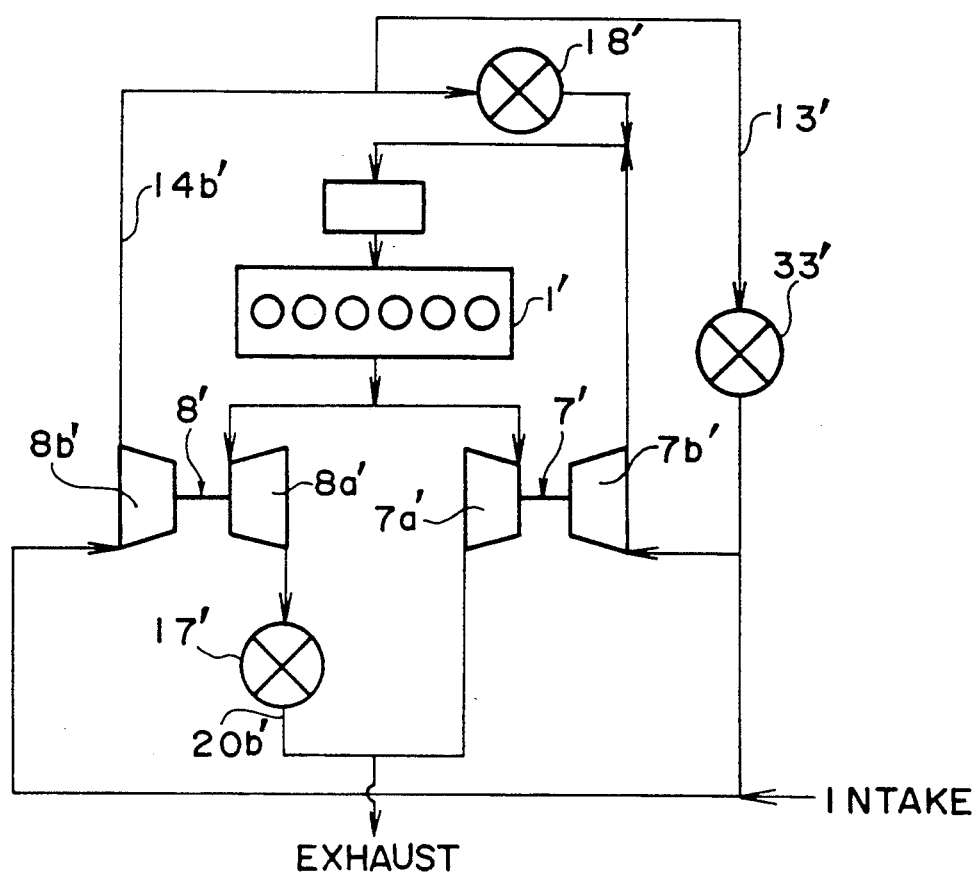
FIG. 13 is a system diagram of a conventional dual turbocharger system.

Seven embodiments will be explained. FIGS. 1, 2, and 4A illustrate the first embodiment, FIG. 4B illustrates the second embodiment, FIG. 4C illustrates the third embodiment, FIGS. 7 to 9 illustrate the fourth embodiment, FIGS. 10A and 10B illustrate the fifth embodiment, FIGS. 11A and 11B illustrate the sixth embodiment, and FIGS. 12A and 12B illustrate the seventh embodiment. The first to seventh embodiments differ from each other only in the structures of an intake switching valve, an actuator therefore as shown in FIGS. 4A, 4B and 4C, and one portion of the flow chart as shown in FIGS. 2, 10B, 11B and 12B. In the explanation below, like reference numerals are used for like members throughout all the embodiments.

Firstly, the first embodiment will be explained. As illustrated in FIG. 1, an internal combustion engine with a dual turbocharger system includes a multi-cylinder engine, for example, a six-cylinder internal combustion engine 1 with an air intake and an exhaust outlet. Cylinders of the engine 1 are grouped into two groups. An exhaust manifold 3 which is connected with the engine exhaust outlets includes a first portion connected with one group of the engine cylinders and a second portion connected with another group of the engine cylinders. The first portion and the second portion of the exhaust manifold 3 communicate with each other by a connecting conduit 3a.

A first turbocharger 7 and a second turbocharger 8 are provided so as to be in parallel with each other with respect to the cylinder 1. The first turbocharger 7 is operated throughout all intake air quantities, and the second turbocharger 8 is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected with the engine exhaust outlet via the exhaust manifold 3. On the other hand, the compressor 7b and the compressor 8b are connected with the air intake of the engine 1 via an intake line.

The intake line connected with the engine air intake includes a first intake passage 15 upstream of the compressors 7b and 8b and a second intake passage 14 downstream of the compressors 7b and 8b. Further, the second intake passage 14 includes a first intake conduit 14a located downstream of and connected with the compressor 7b, a second intake conduit 14b located downstream of and connected with the compressor 8b, a connecting portion 14c where the first intake conduit 14a and the second intake conduit 14b join each other, and a common intake conduit 14d connecting the connecting portion 14c with the engine air intake. In the first intake passage 15, an air cleaner 23 and an air flow meter 24 are installed in that order in an intake air flow direction. An intercooler 6, a throttle valve 4, and a surge tank 2 are also installed in an intake air flow direction, respectively, in the common intake conduit 14d.

An exhaust line 20 connected to the engine exhaust outlets includes a first exhaust conduit 20a connected to the first portion of the exhaust manifold 3, in which the turbine 7a is installed, a second exhaust conduit 20b connected to the second portion of the exhaust manifold 3, in which the turbine 8a is installed, a connecting portion 20c where the first exhaust conduit 20a and the second exhaust conduit 20b join each other, and an exhaust pipe 20d located downstream of and connected to the connecting portion 20c. In the exhaust pipe 20d, a catalytic converter 21 and an exhaust muffler 22 are installed in an exhaust gas flow direction, respectively. Further, at the connecting portion 20c or in the vicinity of the connecting portion 20c, an oxygen sensor 19 is installed.

For the purpose of switching the operation between "one-turbocharger-operation" in which only the first turbocharger 7 is operated at small to medium intake air quantities and "two-turbocharger-operation" in which both the first turbocharger 7 and the second turbocharger 8 are operated at large intake air quantities, an exhaust switching valve 17 is installed in the second exhaust conduit 20b downstream of the turbine 8a, and an intake switching valve 18 is installed in the second intake conduit 14b downstream of the compressor 8b.

When both the exhaust switching valve 17 and the intake switching valve 18 are closed, the operation of the second turbocharger 8 is stopped and therefore, only the first turbocharger 7 is operated. In contrast, when both the exhaust switching valve 17 and the intake switching valve 8 are opened, both the first turbocharger 7 and the second turbocharger 8 are operated.

For the purpose of minimizing a shock which will occur during the transition from "one-turbocharger-operation" to "two-turbocharger-operation", the second turbocharger 18 is run-up before it is fully rotated. In the conventional turbocharged engine, this running-up of the second turbocharger is achieved by partially opening the exhaust switching valve. However, in the present invention, an exhaust by-pass conduit 40 by-passing the exhaust switching valve 17 is provided, and the running-up of the second turbocharger 8 is achieved by opening an exhaust by-pass valve 41 installed in the exhaust by-pass conduit 40. More particularly, when the exhaust by-pass valve 41 is opened, a relatively small amount of exhaust gas flows through the exhaust by-pass conduit 40, so that the second turbocharger 8 is run-up. When the exhaust switching valve 17 is opened, the rotational speed of the second turbocharger 8 is increased from the run-up rotational speed. Therefore, the shock will be effectively suppressed.

When the second turbocharger 8 is preliminarily rotated and the intake switching valve 18 is closed, one portion of the pressurized air in the second intake conduit 14b between the compressor 8b and the intake switching valve 18 will leak through the compressor 8b to flow to a portion of the intake conduit upstream of the compressor 8b and then will again be driven by the compressor 8b to a portion of the intake conduit downstream of the compressor 8b. The leakage and re-pressurization of the intake gas will continually repeat, undesirably increasing the temperature of the intake gas and thus, the temperature of the impeller of the compressor 8b. To prevent the gas from rising in temperature, an intake by-pass conduit 13 is provided so as to by-pass the compressor 8b of the second turbocharger 8. More particularly, the intake by-pass conduit 13 connects the portion of the second intake conduit 14b between the compressor 8b and the intake switching valve 18 with the first intake passage 15 upstream of the compressors 7b and 8b. In the intake by-pass conduit 13, an intake by-pass valve 33 is installed and adapted to open and close the intake by-pass conduit 13. When the second turbocharger 8 is preliminarily rotated, the intake by-pass valve 33 is opened to suppress the temperature increase of the intake gas.

An intake switching valve by-pass conduit 34 may be provided so as to connect a portion of the second intake conduit 14b upstream of the intake switching valve 18 with a portion of the intake conduit 14b downstream of the intake switching valve 18 to by-pass the intake switching valve 18. A check valve 12 is installed in the intake switching valve by-pass conduit 34. The check valve 12 permits the gas to flow in the direction from the portion of the second intake conduit 14b upstream of the intake switching valve 18 toward the portion of the second intake conduit 14b downstream of the intake switching valve 18. As a result, when the intake switching valve 18 is closed and when the compressor outlet pressure of the second turbocharger 8 grows to exceed a compressor outlet pressure of the first turbocharger 7, the check valve 12 opens the by-pass conduit 34 and permits the gas to flow through the check valve 12.

Further, the turbine 7a is provided with a waste gate valve 31. A positive pressure tank 36 is also provided so as to be connected with a portion of the common intake conduit 14d upstream of the intercooler 6 and to hold a charging pressure therein.

Various actuators are provided to operate the above-described valves. More particularly, the waste gate valve 31 is operated by an actuator 9, the intake by-pass valve 33 is operated by an actuator 10, the intake switching valve 18 is operated by an actuator 11, the exhaust switching valve 17 is operated by an actuator 16, and the exhaust by-pass valve 41 is operated by the actuator 42. Each of these actuators comprises a single diaphragm-type actuator.

Various three-way or two-way solenoid valves 25, 26, 27, 28, 32 and 35 are provided to switch on and off the actuators 9, 10, 11, 16, and 42. In this instance, the three-way solenoid valve 25 is omitted in the second and third embodiments. These solenoid valves 25, 26, 27, 28, 32 and 35 operate according to the instructions from an engine control computer 29. In this instance, either one of "ON" of the three-way solenoid valve 25 and "ON" of the three-way valve 26 actuates the actuator 11 to open the intake switching valve 18, and either one of "OFF" of the three-way solenoid valve 25 and "OFF" of the three-way solenoid valve 26 actuates the actuator 11 to close the intake switching valve 18. "ON" of the three-way solenoid valve 28 actuates the actuator 16 to open the exhaust switching valve 17, and "OFF" of the three-way solenoid valve 28 actuates the actuator 16 to close the exhaust switching valve 17. "ON" of the three-way solenoid valve 27 actuates the actuator 10 to close the intake by-pass valve 33, and "OFF" of the three-way solenoid valve 27 actuates the actuator 10 to open the intake by-pass valve 33. "ON" of the two-way solenoid valve 32 which may comprise a duty control valve actuates the actuator 42 to open the exhaust by-pass valve 41, and "OFF" of the two-way solenoid valve 32 actuates the actuator 42 to close the exhaust by-pass valve 41. Further, the actuator 16 includes a diaphragm chamber 16a; the actuator 10 includes a diaphragm chamber 10a; the actuator 11 includes diaphragm chambers 11a and 11b; the actuator 42 includes a diaphragm chamber 42a; and the actuator 9 includes a diaphragm chamber 9a.

Various sensors for sensing the engine operating conditions are provided and the outputs of the sensors are fed to the engine control computer 29. More particularly, the various sensors include an intake pressure sensor 30, a throttle opening degree detecting sensor 5, an intake air quantity detecting sensor comprising an air flow meter 24, the aforementioned oxygen sensor 19, an engine speed sensor (not shown), and a vehicle speed sensor (not shown).

The engine control computer 29 includes a central processor unit (CPU), a read-only memory (ROM), a random access memory (RAM), an input and output interface (I/0 interface), and an analogue/digital convertor (A/D convertor) like a usual micro computer. FIG. 2 illustrates a program according to which the turbocharged internal combustion engine of the first embodiment is operated. The program of FIG. 2 is stored in the ROM and is fed into the CPU where the routine is executed to operate the above-described valves and actuators.

The structures for control of the turbocharged engine and operation of the turbocharged engine in accordance with the first embodiment will now be explained with reference to FIG. 2. The routine is entered at step 100, and then the intake air quantity, that is, an output signal from the air flow meter 24 is read at step 101.

Figure 5:
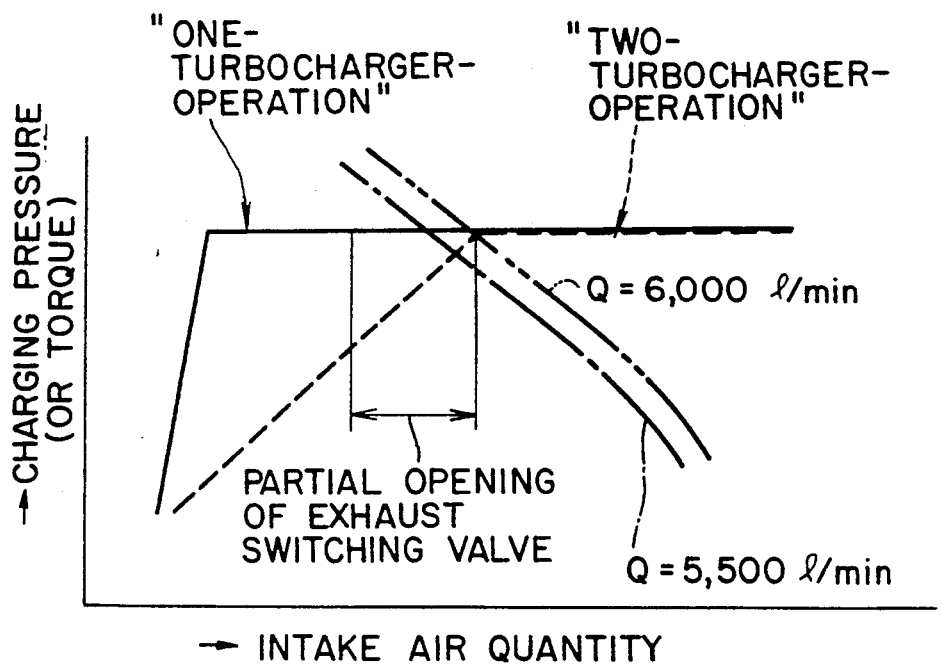
FIG. 5 is a graph illustrating a charging pressure versus intake air quantity characteristic of the internal combustion engine with a dual turbocharger system in accordance with any embodiment of the present invention.

Then, at step 102, it is determined whether or not the intake air quantity Q is larger than a predetermined quantity, for example, 5,500 l/min, that is, whether or not the current engine operational condition is a condition to be operated under "two-turbocharger-operation". More particularly, when Q is larger than 5,500, the current condition is deemed to be a condition to be operated under "two-turbocharger-operation". In contrast, when Q is equal to or less than 5,500, the current condition is deemed to be a condition to be operated under "one-turbocharger-operation". However, since there is a time lag in switching the "one-turbocharger-operation" to the "two-turbocharger-operation", an actual change will occur at about 6,000 l/min rather than at 5,500 l/min as shown in FIG. 5.

When the engine operational condition is determined to be a condition to be operated under "two-turbocharger-operation", the routine proceeds to a step 103. At step 103, in a case where the intake switching valve 18 is at a partially opened state, the three-way solenoid valve 26 is switched to "OFF" to close the intake switching valve 18. Then, at step 104, the three-way solenoid valve 27 is switched to "ON" to introduce the intake pressure at a portion of the intake conduit downstream of the compressor (the charging pressure) into the diaphragm chamber 10a of the actuator 10 to thereby close the intake by-pass valve 33.

Then, the routine further proceeds to a step 105. At step 105, after a short period of time necessary to run-up the second turbocharger 8, for example, one second after the switching-on of the three-way solenoid valve 27, the three-way solenoid valve 28 is switched to "ON" to introduce the charging pressure into the diaphragm chamber 16a of the actuator 16 to thereby open the exhaust switching valve 17. If the compressor outlet pressure of the second turbocharger 8 grows greater than the compressor outlet pressure of the first turbocharger 7, the charging air pressurized by the second turbocharger 8 passes through the check valve 12 and is supplied to the engine 1. Then, at a step 106, after a short period of time, for example, 0.5 seconds after the switching-on of the three-way solenoid valve 28, the three-way solenoid valve 25 is switched to "ON" to introduce the charging pressure into the diaphragm chamber 11a of the actuator 11 to thereby open the intake switching valve 18. In this state, both the first turbocharger 7 and the second turbocharger 8 are operating. Then, the routine proceeds to a step 117 and returns to another routine (not shown).

When the engine operational condition is determined to be a "one-turbocharger-operation" condition at the aforementioned step 102, the routine proceeds to a step 107. At step 107, the three-way valve 25 is switched to "OFF" to close the intake switching valve 18. Then, at step 108, the three-way solenoid valve 28 is switched to "OFF" to close the exhaust switching valve 17. Then, at step 109, the three-way solenoid valve 27 is switched to "OFF" to open the intake by-pass valve 33. By these steps 107, 108 and 109, the "one-turbocharger-operation" is produced. In this state, even if the second turbocharger 8 is rotated by the engine exhaust pressure, the air pressurized by the compressor 8b returns to the first intake passage 15 through the intake by-pass conduit 13.

Then, the routine proceeds to a step 110 where the intake gas pressure PM is read. Then, at step 111, whether or not the read intake gas pressure PM is less than a predetermined pressure, for example, 500 mm Hg at which the second turbocharger 8 should begin to be run-up is determined. If the charging pressure PM is less than 500 mm Hg, the engine operational condition is deemed to be a condition to maintain the current "one-turbocharger-operation" and the routine proceeds to a step 112. At step 112, the two-way solenoid valve 32 which comprises a duty control valve is switched to "OFF" to introduce the atmospheric pressure into the diaphragm chamber 42a of the actuator 42 to thereby close the exhaust by-pass valve 41.

Then, the routine proceeds to a step 113 where whether or not the engine load is low, for example, whether or not the intake pressure PM is smaller than −100 mm Hg is determined. If PM is equal to or larger than −100 mm Hg and, therefore, the engine load is high, the routine proceeds to a step 116 where the three-way solenoid valve 26 is switched to "OFF" to close the intake switching valve 18. In this state, since the intake switching valve 18 is closed and the exhaust switching valve 17 is closed, the turbocharged system operates according to the "one-turbocharger-operation" and a good torque response is obtained.

When PM is smaller than −100 mm Hg and, therefore, the engine load is determined to be low at step 113, the routine proceeds to a step 114. One of the most important features of the invention exists in the provision of steps 13 and 14. At step 114, the three-way solenoid valve 26 is switched to "ON" to introduce the negative pressure at the surge tank 2 into a diaphragm chamber 11b of the actuator 11 to thereby open the intake switching valve 18. In this state, since the exhaust switching valve 17 is closed, the second turbocharger 8 is not driven and only the first turbocharger 7 operates. However, since the intake switching valve 18 is opened, the intake air can be sucked through both the first intake conduit 14a and the second intake conduit 14b. As a result, a great amount of intake air can be supplied to the engine 1 and the acceleration characteristic from a low engine load is improved as shown by characteristic C of FIG. 6. Then, the routine proceeds to a step 117 and returns to another routine.

Figure 6:
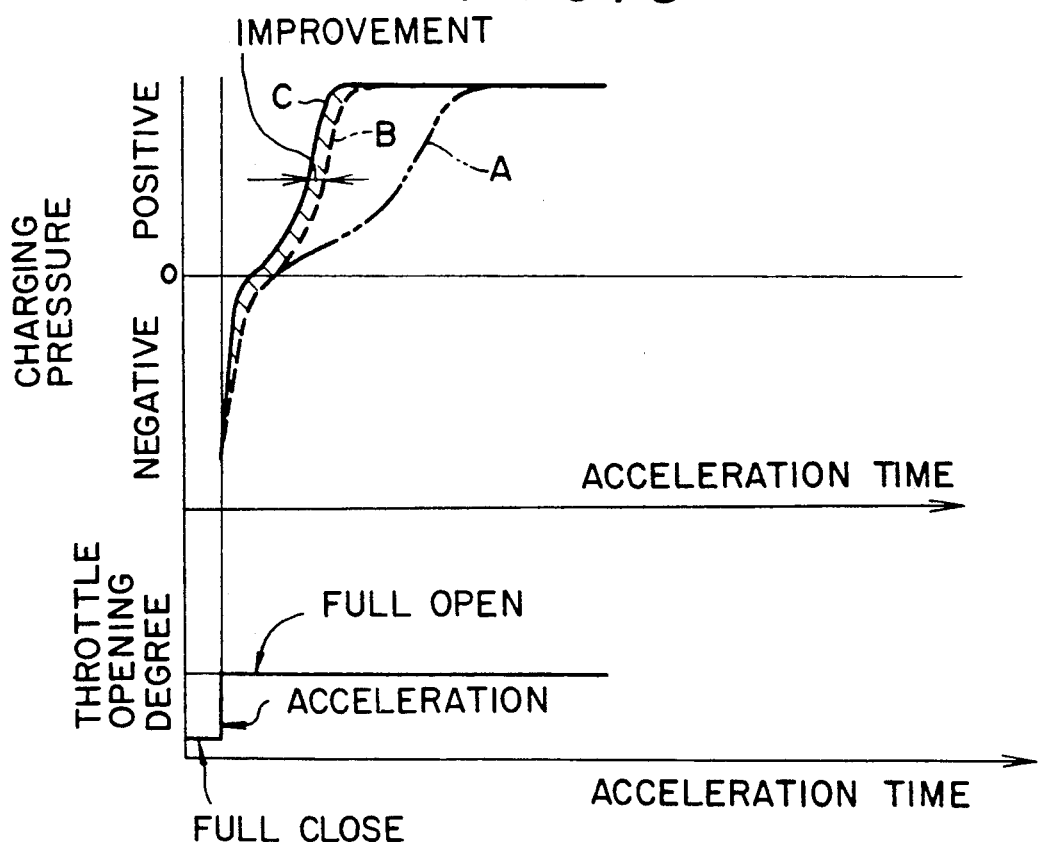
FIG. 6 is a graph illustrating a charging pressure and throttle opening degree versus acceleration time characteristic of the internal combustion engine with a dual turbocharger system in accordance with any embodiment of the present invention.

FIGS. 5 and 6 illustrate the operational features of the invention. Since "one-turbocharger-operation" has a better response characteristic B than the characteristic A of "two-turbocharger-operation" at small to medium intake air quantities, the operation of the second turbocharger 8 is stopped at the small to medium intake air quantities and is operated only at large intake air quantities. Further, since the intake air switching valve 18 is opened at low engine loads in the "one-turbocharger-operation", a great amount of intake air can be lead into the engine cylinders through both the compressor 7b and the compressor 8b. As a result, the flow resistance due to the compressor impeller is reduced and the response characteristic from the low engine load is improved as shown by characteristic C of FIG. 6.

When the charging pressure PM is not less than +500 mm Hg at step 111, the routine proceeds to a step 115 where the two-way solenoid valve 32 is switched to "ON" to open the exhaust by-pass valve 41. In this way, before the current operation is changed from "one-turbocharger-operation" to "two-turbocharger-operation", the exhaust by-pass valve 41 is opened to run-up the second turbocharger 8. As a result, a shock at the transition from "one-turbocharger-operation" to "two-turbocharger-operation" is effectively suppressed.

As will be apparent from the above-description, the turbocharged engine of the first embodiment includes intake switching valve operating means for opening the intake switching valve 18 of a butterfly valve at large intake air quantities and at small to medium intake air quantities and low engine loads, and closing the intake switching valve 18 at small to medium intake air quantities and high engine loads. The turbocharged engine of the first embodiment further includes exhaust switching valve operating means for opening the exhaust switching valve 17 at large intake air quantities and closing the exhaust switching valve 17 at small to medium intake air quantities.

More particularly, as illustrated in FIG. 4A, the intake air switching valve operating means includes the diaphragm actuator 11, the three-way solenoid valve 25, and the three-way solenoid valve 26. The diaphragm actuator 11 includes a diaphragm operatively coupled to the intake switching valve 18, a first chamber 11a on one side of the diaphragm, and a second chamber 11b on another side of the diaphragm. The solenoid valve 25 is connected to the first chamber 11a and adapted to switch between conducting a positive pressure from the positive pressure tank 36 into the first chamber 11a at large intake air quantities to open the intake switching valve 18 and conducting an atmospheric pressure into the first chamber 11a at small to medium intake air quantities to close the intake switching valve 18. The three-way solenoid valve 26 is connected to the second chamber 11b and adapted to switch between conducting an atmospheric pressure into the second chamber 11b at high engine loads to close the intake switching valve 18 and conducting a negative pressure from the surge tank 2 into the second chamber 11b at low engine loads to open the intake switching valve 18 despite the small to medium intake air quantities.

The above-described control can be summarized as shown in FIG. 3. As shown in FIG. 3, a control apparatus includes intake air quantity detecting means 201, engine load detecting means 202 provided for the engine 1, intake air quantity determining means 203 for determining whether the current intake air quantity detected by the intake air quantity detecting means is at large intake air quantities or at small to medium intake air quantities, engine load determining means 204 for determining whether the current engine load detected by the engine load detecting means is at high engine loads or at low engine loads, first valve operation control means 205 for opening the intake switching valve and the exhaust switching valve when the intake air quantity determining means determines that the current intake air quantity is at large intake air quantities, second valve operation control means 206 for closing the intake switching valve and the exhaust switching valve when the intake air quantity determining means determines that the current intake air quantity is at small to medium intake air quantities and the engine load determining means determines that the current engine load is at high loads, and third valve operation control means 207 for opening the intake switching valve and closing the exhaust switching valve when the intake air quantity determining means determines that the current intake air quantity is at small to medium intake air quantities and the engine load determining means determines that the current engine load is at low loads.

In this instance, the intake air quantity detecting means 201 includes the flow meter 24 installed in an intake line of the engine. The engine load detecting means 202 comprises an intake pressure detecting sensor 30 installed in an intake line of the engine. The intake air quantity determining means 203 includes step 102 of the program. The engine load determining means 204 includes step 113. The first valve operation control means 205 includes steps 105 and 106. The second valve operation control means 206 includes step 116. The third valve operation control means 207 includes step 114.

Next, the second embodiment of the present invention will be explained with reference to FIG. 4B. Since the second embodiment differs from the first embodiment only in the intake switching valve operating means, only the different portions will be explained.

The intake switching valve operating means of the second embodiment includes a diaphragm actuator 11B and a single three-way solenoid valve 26B which corresponds to the solenoid valve 26 of the first embodiment. The solenoid valve 25 of the first embodiment is omitted to simplify the structure. The diaphragm actuator 11B includes a diaphragm coupled to the intake air switching valve 18, a first chamber 11Ba on one side of the diaphragm, and a second chamber 11Bb on another side of the diaphragm. The atmospheric pressure is continuously conducted into the first chamber 11Ba. The three-way solenoid valve 26B is connected to the second chamber 11Bb and adapted to switch between conducting a negative pressure into the second chamber 11Bb at larger intake air quantities and at small and medium intake air quantities and low engine loads to open the intake air switching valve 18 and conducting the atmospheric pressure into the second chamber 11Bb at small and medium intake air quantities and high engine loads to close the intake switching valve 18.

The turbocharged engine of the second embodiment includes a negative pressure tank 36B connected to a portion of the intake line downstream of the throttle valve 4, and the three-way solenoid valve 26B is connected to the negative pressure tank 36B.

With respect to the control flow chart of the second embodiment, the flow chart of FIG. 2 can be used by changing "valve 26" to "valve 26B" in step 103, "valve 25" to "valve 26B" in step 106, "valve 25" to "valve 26B" in step 107, "valve 26" to "valve 26B" in step 114, and "valve 26" to "valve 26B" in step 116. Other structures and operation of the second embodiment are the same as those of the first embodiment.

Next, the third embodiment of the present invention will be explained with reference to FIG. 4C. Since the third embodiment differs from the first embodiment only in the intake switching valve operating means, only the different portions will be explained.

The intake switching valve operating means of the third embodiment includes a diaphragm actuator 11C and a single three-way solenoid valve 26C which corresponds to the solenoid valve 26 of the first embodiment. The solenoid valve 25 of the first embodiment is omitted to simplify the structure. The diaphragm actuator 11C includes a diaphragm coupled to the intake air switching valve 18, a first chamber 11Ca on one side of the diaphragm, and a second chamber 11Cb on another side of the diaphragm. The atmospheric pressure is continuously conducted into the second chamber 11Cb. The three-way solenoid valve 26C is connected to the first chamber 11Ca and adapted to switch between conducting a positive pressure into the first chamber 11Ca at larger intake air quantities and at small and medium intake air quantities and low engine loads to open the intake air switching valve 18 and conducting the atmospheric pressure into the first chamber 11Ca at small and medium intake air quantities and high engine loads to close the intake switching valve 18. The three-way solenoid valve 26C is connected to the positive pressure tank 36 so than the solenoid valve 26C can conduct a positive pressure to the actuator 11C from the tank 36.

With respect to the control flow chart of the third embodiment, the flow chart of FIG. 2 can be used by changing "valve 26" to "valve 26C" in step 103, "valve 25" to "valve 26C" in step 106, "valve 25" to "valve 26C" in step 107, "valve 26" to "valve 26C" in step 114, and "valve 26" to "valve 26C" in step 116. Other structures and operation of the third embodiment are the same as those of the first embodiment.

Next, the fourth embodiment of the invention will be explained with reference to FIGS. 7, 8 and 9. In the fourth embodiment, an intake switching valve 18D is constructed of a swing arm-type valve which has a smaller flow resistance than a butterfly valve because a valve shaft 52 does not cross the interior of a valve casing 54. A lever 53 is fixed to an outside end portion of the valve shaft 52 so that the lever 53, the valve shaft 52 and the valve member 51 rotate together. Between the lever 53 and the valve casing 54 is provided a torsional spring 55 which biases the valve toward the closing direction. A slot 58 is formed in the lever 53. A link 57 is provided between the lever 53 and a rod 57 of the actuator 11D. One end portion of the link 57 rotatably engages an end portion of the actuator rod 57 and another end portion of the link 57 slidably and rotatably engages the lever 53 at the slot 58. As illustrated in FIG. 8, when the actuator rod 57 reciprocates, the lever 53 is rotated and the valve member 51 rotates between a full close position shown by a full line and a full open position shown in a two-dotted line. As illustrated in FIG. 9, when a pressure acts on the valve member 51 in the direction from an upstream side, the valve member 51 rotates to open. In this instance, the lever 53 can rotate because the end portion of the link 56 and the lever 53 can slide at the slot 58. In this way, when the compressor outlet pressure of the second turbocharger 8 becomes greater than the compressor outlet pressure of the first turbocharger 7, the valve member 51 itself opens and allows the intake gas to flow toward the engine cylinders. Therefore, the intake switching valve by-pass conduit 34 and the one-way valve 12 of the first embodiment can be omitted in the fourth embodiment. This simplifies the structure in the vicinity of the intake switching valve.

Next, the fifth embodiment will be explained with reference to FIGS. 10A and 10B. In the fifth embodiment, an intake air quantity condition is added to the opening condition of the intake switching valve 18 during "one-turbocharger-operation". More particularly, when the intake switching valve 18 is open during "one-turbocharger-operation", one portion of the intake air compressed by the first turbocharger compressor 7b returns through the second turbocharger compressor 8b to the upstream portion of the first turbocharger 7 to circulate. When the intake air quantity is larger than a second intake air quantity, for example 500 l/min, which should be smaller than the value of step 102, the intake air condition is in a charging condition. When the intake switching valve 18 is suddenly closed in such a charging condition under the "one-turbocharger-condition", the torque will suddenly increase to cause a shock. In the fifth embodiment, an intake air quantity condition is added to prevent such a shock from happening.

More particularly, as illustrated in FIG. 10A, an intake valve switching valve 18 of the fifth embodiment is controlled to open under the "one-turbocharger-operation" when both the condition that the intake pressure is lower than a predetermined intake pressure (for example, −100 mm Hg) and the condition that the intake quantity is smaller than the second intake air quantity (for example, 500 l/min) are satisfied. The hatched portion of FIG. 10A illustrates the intake switching valve opening range which is defined by not only the intake pressure line of −100 mm Hg but also the intake air quantity line of 500 m/l. Also, preferably, the opening and closing characteristic of the intake switching valve 18 is predetermined to draw a hysteresis to make the switching stable as illustrated in FIG. 10A, though the hysteresis characteristic is not absolutely needed.

FIG. 10B illustrates a control flow for executing the intake switching valve opening operation of FIG. 10A. Since the steps of FIG. 10B correspond to the step 103 of the first embodiment and other steps are the same as those of FIG. 2, explanation about the same steps will be omitted. In FIG. 10B, the routine proceeds from the step 112 of FIG. 2 to a step 113A where whether or not the intake air quantity Q is smaller than the second intake air quantity (for example, 500 l/min) is determined. When Q is determined not to be smaller than 500 l/min, the routine proceeds to the step 116 of FIG. 2, and when Q is determined to be smaller than 500 l/min, the routine proceeds to a step 113B where whether or not the solenoid valve 26 is switched to "ON" is determined. If the solenoid valve 26 is determined not to be switched to "ON" at step 113B, the routine proceeds to a step 113C where whether or not the intake air quantity Q is larger than 300 l/min is determined. When Q is determined to be larger than 300 l/min at step 113C, the routine proceeds to the step 116 of FIG. 2, and when Q is determined not to be larger than 300 l/min at step 113C, the routine proceeds to a step 113D. Also, when the solenoid valve 26 is determined to be switched to "ON" at step 113B, the routine proceeds to step 113D. At step 113D, whether or not the intake pressure PM is lower than a predetermined pressure (for example, −200 mm Hg) is determined. When PM is determined to be smaller than −200 mm Hg at step 113D, the routine proceeds to the step 114 of FIG. 2. When PM is determined not to be smaller than −200 mm Hg at step 113D, the routine proceeds to a step 113E where whether or not the solenoid valve 26 is switched to "ON" is determined. When the solenoid valve 26 is determined not to be switched to "ON" at step 113E, the routine proceeds to the step 116 of FIG. 2, and when the solenoid valve 26 is determined to be switched to "ON" at step 113E, the routine proceeds to a step 113F where whether or not the intake pressure PM is lower than the second pressure (for example, −100 mm Hg) is determined. When PM is determined not to be lower than −100 mm Hg at step 113F, the routine proceeds to step 116 of FIG. 2, and when PM is determined to be lower than −100 mm Hg at step 113F, the routing proceeds to the step 117 of FIG. 2. In this way, the control of FIG. 10B is performed by the control flow of FIG. 10B. In the above-described routine, the steps 113A and 113C compose intake switching valve opening range limiting means.

Next, the sixth embodiment will be explained with reference to FIGS. 11A and 11B. A shock will happen when the intake switching valve 18 is suddenly closed at high engine speeds under the "one-turbocharger-operation" like the sudden close at large air quantities of the fifth embodiment. In the sixth embodiment, an engine speed condition is added to the opening condition of the intake switching valve 18 during "one-turbocharger-operation" to prevent the shock from happening. More particularly, the intake switching valve 18 is opened under the "one-turbocharger-operation" only when both the condition that the intake pressure is lower than the predetermined pressure (for example, −100 mm Hg) and the condition that the engine speed is lower than a predetermined speed (for example, 2,500 rpm) are satisfied as shown in 11A. The hatched portion of FIG. 11A illustrates the intake switching valve opening range which is defined not only the intake pressure line of −100 mm Hg but also the engine speed line of 2,500 rpm.

FIG. 11B illustrates a control flow for executing the intake switching valve opening operation of FIG. 11A. Since the control flow of FIG. 11B is the same as that of FIG. 10B except that the steps 113A and 113C of FIG. 10B are replaced by steps 113A1 and 113C1 in FIG. 11B, only the different steps will be explained. In step 113A1, whether or not the engine speed NE is smaller than the predetermined engine speed (for example, 2,500 rpm) is determined, and in step 113C1, whether or not the engine speed NE is higher than another predetermined speed (for example, 2,000 rpm) is determined. By the flow of FIG. 11B, the valve opening operation of FIG. 11A is performed. In the above-described routine, the steps 113A1 and 113C1 compose intake switching valve opening range limiting means.

Next, the seventh embodiment will be explained with reference to FIGS. 12A and 12B. A shock will happen when the intake switching valve 18 is suddenly closed at high vehicle speeds under the "one-turbocharger-operation" like the sudden close at large air quantities of the fifth embodiment. In the seventh embodiment, a vehicle speed condition is added to the opening condition of the intake switching valve 18 during "one-turbocharger-operation" to prevent the shock from happening. More particularly, the intake switching valve 18 is opened under the "one-turbocharger-operation" only when both the condition that the intake pressure is lower than the predetermined pressure (for example, −100 mm Hg) and the condition that the vehicle speed is lower than a predetermined speed (for example, 80 km/h) are satisfied as shown in 12A. The hatched portion of FIG. 12A illustrates the intake switching valve opening range which is defined not only the intake pressure line of −100 mm Hg but also the vehicle speed line of 80 km/h.

FIG. 12B illustrates a control flow for executing the intake switching valve opening operation of FIG. 12A. Since the control flow of FIG. 12B is the same as that of FIG. 10B except that the steps 113A and 113C of FIG. 10B are replaced by steps 113A2 and 113C2 in FIG. 12B, only the different steps will be explained. In step 113A2, whether or not the vehicle speed SPD is smaller than the predetermined vehicle speed (for example, 80 km/h) is determined, and in step 113C2, whether or not the vehicle speed SPD is higher than another predetermined speed (for example, 60 km/h) is determined. By the flow of FIG. 12B, the valve opening operation of FIG. 12A is performed. In the above-described routine, the steps 113A2 and 113C2 compose intake switching valve opening range limiting means.

In accordance with the present invention, the following advantages are obtained.

First, since the intake switching valve 18 are opened at small to medium intake air quantities and low engine loads, the response characteristic from low engine loads is improved.

Second, in the case where the actuator 11B or 11C is operated by a single three-way solenoid valve 26B or 26C, the actuator driving structure can be simplified.

Third, in the case where the intake switching valve 18D has in itself an opening mechanism for producing a one-way valve function, an intake switching mechanism by-passing conduit and a one way valve provided therein are omitted. As a result, the structure will be further simplified.

Fourth, in the case where the intake switching valve opening range under "one-turbocharger-operation" is limited not only by the intake pressure but also any one of an intake air quantity, an engine speed and a vehicle speed, a shock at closing of the intake switching valve 18 will be prevented.

Although several embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An internal combustion engine with a dual turbocharger system comprising:

a multi-cylinder internal combustion engine with an air intake and at least one exhaust outlet, cylinders of the engine being grouped into two groups;

an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;

a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;

an intake line including a first intake conduit located downstream of and connected with the first turbocharger compressor, a second intake conduit located downstream of an connected with the second turbocharger compressor, an intake connecting portion where the first intake conduit and the second intake conduit join, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed in the second intake conduit downstream of the second turbocharger compressor, but upstream of the intake connecting portion and adapted to open and close the second intake conduit;

an exhaust switching valve installed downstream of the second turbocharger turbine in the second exhaust conduit and adapted to open and close the second exhaust conduit;

intake switching valve operating means for opening the intake switching valve at large intake air quantities and at small to medium intake air quantities and low engine loads, and closing the intake switching valve at small to medium intake air quantities and high engine loads; and exhaust switching valve operating means for opening the exhaust switching valve at large intake air quantities and closing the exhaust switching valve at small to medium intake air quantities.

2. An internal combustion engine with a dual turbocharger system according to claim 1, wherein the intake switching valve comprises a butterfly valve.

3. An internal combustion engine with a dual turbocharger system according to claim 1, wherein the intake switching valve comprises a swing arm-type valve.

4. An internal combustion engine with a dual turbocharger system according to claim 3, and further comprising:
- a lever fixed to a valve shaft of the intake switching valve, the lever including a slot formed therein;
- a spring provided between the lever and a valve casing so as to bias the intake switching valve toward a closing direction; and
- a link provided between the lever and a rod of an actuator for operating the intake switching valve, one end of the link rotatably engaging an end portion of the actuator rod and another end portion of the link rotatably and slidably engaging the lever at the slot.

5. An internal combustion engine with a dual turbocharger system according to claim 1, and further comprising intake switching valve opening range limiting means for sensing at the time of one-turbocharger-operation a current intake air quantity and comparing the current intake air quantity to a small predetermined intake air quantity and opening the intake switching valve only when the current intake air quantity is smaller than the predetermined intake air quantity.

6. An internal combustion engine with a dual turbocharger system according to claim 5, wherein the predetermined intake air quantity is 500 l/min.

7. An internal combustion engine with a dual turbocharger system according to claim 1, and further comprising intake switching valve opening range limiting means for sensing at the time of one-turbocharger-operation a current engine speed and comparing the current engine speed to a predetermined engine speed and opening the intake switching valve only when the current engine speed is smaller than the predetermined engine speed.

8. An internal combustion engine with a dual turbocharger system according to claim 7, wherein the predetermined engine speed is 2,500 rpm.

9. An internal combustion engine with a dual turbocharger system according to claim 7, wherein the predetermined vehicle speed is 80 km/h.

10. An internal combustion engine with a dual turbocharger system according to claim 1, and further comprising intake switching valve opening range limiting means for sensing at the time of one-turbocharger-operation a current vehicle speed and comparing the current vehicle speed to a predetermined vehicle speed and opening the intake switching valve only when the current vehicle speed is lower than the predetermined vehicle speed.

11. An internal combustion engine with a dual turbocharger system comprising:
- a multi-cylinder internal combustion engine with an air intake and at least one exhaust outlet, cylinder of the engine being grouped into two groups;
- an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;
- a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;
- an intake line including a first intake conduit connected with the first turbocharger compressor, a second intake conduit connected with the second turbocharger compressor, an intake connecting portion where the first intake conduit and the second intake conduit join, and an intake common conduit connecting the intake connecting portion and the air intake of the engine;
- an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;
- an intake switching valve installed downstream of the second turbocharger compressor in the second intake conduit and adapted to open and close the second intake conduit;
- an exhaust switching valve installed downstream of the second turbocharger turbine in the second exhaust conduit and adapted to open and close the second exhaust conduit;
- intake switching valve operating means for opening the intake switching valve at large intake air quantities and at small to medium intake air quantities and low engine loads, and closing the intake switching valve at small to medium intake air quantities and high engine loads;
- exhaust switching valve operating means for opening the exhaust switching valve at large intake air quantities and closing the exhaust switching valve at small to medium intake air quantities;

an exhaust by-pass conduit with a first end and a second end, the first end of the exhaust by-pass conduit being connected to a portion of the second exhaust conduit downstream of the second turbocharger turbine and upstream of the exhaust switching valve, and the second end of the exhaust by-pass conduit being connected to a portion of the first exhaust conduit downstream of the first turbocharger turbine;

an exhaust by-pass valve installed in the exhaust by-pass conduit and adapted to open and close the exhaust by-pass conduit; and exhaust by-pass valve operating means for opening the exhaust by-pass valve only during transition from one-turbocharger-operation to two-turbocharger-operation.

12. An internal combustion engine with a dual turbocharger system comprising:

a multi-cylinder internal combustion engine with an air intake and at least one exhaust outlet, cylinders of the engine being grouped into two groups;

an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;

a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;

an intake line including a first intake conduit connected with the first turbocharger compressor, a second intake conduit connected with the second turbocharger compressor, an intake connecting portion where the first intake conduit and the second intake conduit join, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed downstream of the second turbocharger compressor in the second intake conduit and adapted to open and close the second intake conduit;

an exhaust switching valve installed downstream of the second turbocharger turbine in the second exhaust conduit and adapted to open and close the second exhaust conduit;

intake switching valve operating means for opening the intake switching valve at large intake air quantities and at small to medium intake air quantities and low engine loads, and closing the intake switching valve at small to medium intake air quantities and high loads;

exhaust switching valve operating means for opening the exhaust switching valve at large intake air quantities and closing the exhaust switching valve at small to medium intake air quantities;

an intake by-pass conduit connecting a portion of the second intake conduit downstream of the second turbocharger compressor and upstream of the intake switching valve with a portion of the intake line upstream of the second turbocharger compressor and the first turbocharger compressor;

an intake by-pass valve installed in the intake by-pass conduit and adapted to open and close the intake by-pass conduit; and intake by-pass valve operating means for opening the intake by-pass valve at small to medium intake air quantities and closing the intake by-pass valve at large intake air quantities;

13. An internal combustion engine with a dual turbocharger system comprising:

a multi-cylinder internal combustion engine with an air intake and at least one exhaust outlet, cylinders of the engine being grouped into two groups;

an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;

a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;

an intake line including a first intake conduit connected with the first turbocharger compressor, a second intake conduit connected with the second turbocharger compressor, an intake connecting portion where the first intake conduit and the second intake conduit join, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed downstream of the second turbocharger compressor in the second intake conduit and adapted to open and close the second intake conduit;

an exhaust switching valve installed downstream of the second turbocharger turbine in the second exhaust conduit and adapted to open and close the second exhaust conduit;

intake switching valve operating means for opening the intake switching valve at large intake air quantities and at small to medium intake air quantities and low engine loads, and closing the intake switching valve at small to medium intake air quantities and high engine loads;

exhaust switching valve operating means for opening the exhaust switching valve at large intake air quantities and closing the exhaust switching valve at small to medium intake air quantities;

an intake switching valve by-pass conduit by-passing the intake switching valve; and a one-way valve installed in the intake switching valve by-pass conduit and adapted to permit air to flow only from an upstream portion of the intake air switching valve to a downstream portion of the intake air switching valve.

14. An internal combustion engine with a dual turbocharger system comprising:

a multi-cylinder internal combustion engine with an air intake and at least one exhaust outlet, cylinders of the engine being grouped into two groups;

an exhaust manifold connected with the engine exhaust outlet, the exhaust manifold including a first portion connected to one group of the cylinders and a second portion connected to another group of the cylinders, and first portion and the second portion of the exhaust manifold communicating with each other by a connecting conduit;

a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;

an intake line including a first intake conduit connected with the first turbocharger compressor, a second intake conduit connected with the second turbocharger compressor, an intake connecting portion where the first intake conduit and the second intake conduit join, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed downstream of the second turbocharger compressor in the second intake conduit and adapted to open and close the second intake conduit;

an exhaust switching valve installed downstream of the second turbocharger turbine in the second exhaust conduit and adapted to open and close the second exhaust conduit;

intake switching valve operating means for opening the intake switching valve at large intake air quantities and at small to medium intake air quantities and low engine loads, and closing the intake switching valve at small to medium intake air quantities and high engine loads; and exhaust switching valve operating means for opening the exhaust switching valve at large intake air quantities and closing the exhaust switching valve at small to medium intake air quantities;

wherein the intake switching valve operating means include:

a diaphragm actuator including a diaphragm operatively coupled to the intake switching valve, a first chamber on one side of the diaphragm, and a second chamber on another side of the diaphragm;

a first three-way solenoid valve connected to the first chamber and adapted to switch between conducting a positive pressure into the first chamber at large intake air quantities to open the intake switching valve and conducting an atmospheric pressure into the first chamber at small to medium intake air quantities to close the intake switching valve; and a second three-way solenoid valve connected to the second chamber and adapted to switch conducting an atmospheric pressure into the second chamber at high engine loads to close the intake switching valve and conducting a negative pressure into the second chamber at low engine loads to open the intake switching valve despite small to medium intake air quantities.

15. An internal combustion engine with a dual turbocharger system according to claim 14, and further comprising a positive pressure tank connected to a portion of the intake line downstream of the intake switching valve and upstream of a throttle valve, the first three-way solenoid valve being connected to the positive pressure tank.

16. An internal combustion engine with a dual turbocharger system comprising:

a multi-cylinder internal combustion engine with an air intake and at least one exhaust outlet, cylinders of the engine being grouped into two groups;

an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;

a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;

an intake line including a first intake conduit connected with the first turbocharger compressor, a second intake conduit connected with the second turbocharger compressor, an intake connecting portion where the first intake conduit and the second intake conduit join, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed downstream of the second turbocharger compressor in the second intake conduit and adapted to open and close the second intake conduit;

an exhaust switching valve installed downstream of the second turbocharger turbine in the second exhaust conduit and adapted to open and close the second exhaust conduit;

intake switching valve operating means for opening the intake switching valve at large intake air quantities and at small to medium intake air quantities and low engine loads, and closing the intake switching valve at small to medium intake air quantities and high engine loads; and exhaust switching valve operating means for opening the exhaust valve at large intake air quantities and closing the exhaust switching valve at small to medium intake air quantities;

wherein the intake switching valve operating means includes:

a diaphragm actuator including a diaphragm operatively coupled to the intake switching valve, a first chamber on one side of the diaphragm, and a second chamber on another side of the diaphragm, an atmospheric pressure being continuously connected into the first chamber; and a three-way solenoid valve connected to the second chamber and adapted to switch between conducting a negative pressure into the second chamber at large intake air quantities and at small and medium intake air quantities and low engine loads to open the intake air switching valves, and conducting an atmospheric pressure into the second chamber at small and medium intake air quantities and high engine loads to close the intake switching valve.

17. An internal combustion engine with a dual turbocharger system according to claim 16, and further comprising a negative pressure tank connected to a portion of the intake line downstream of a throttle valve, the three-way valve being connected to the negative pressure tank.

18. An internal combustion engine with a dual turbocharger system comprising:

a multi-cylinder internal combustion engine with an air intake and at least one exhaust outlet, cylinders of the engine being grouped into two groups;

an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;

a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;

an intake line including a first intake conduit connected with the first turbocharger compressor, a second intake conduit connected with the second turbocharger compressor, an intake connecting portion where the first intake conduit and the second intake conduit join, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connected portion where the first exhaust conduit and the second exhaust conduit join each other, and an exhaust pipe located downstream of and connected with the exhaust connecting portion;

an intake switching valve installed downstream of the second turbocharger compressor in the second intake conduit and adapted to open and close the second intake conduit;

an exhaust switching valve installed downstream of the second turbocharger turbine in the second exhaust conduit and adapted to open and close the second exhaust conduit;

intake switching valve operating means for opening the intake switching valve at large intake air quantities and at small to medium intake air quantities and low engine loads, and closing the intake switching valve at small to medium intake air quantities and high engine loads; and exhaust switching valve operating means for opening the exhaust switching valve at large intake air quantities and closing the exhaust switching valve at small to medium intake air quantities;

wherein the intake switching valve operating means includes:

a diaphragm actuator including a diaphragm operatively coupled to the intake switching valve, a first chamber on one side of the diaphragm, and a second chamber on another side of the diaphragm, an atmospheric pressure being continuously conducted into the second chamber; and a three-way solenoid valve connected to the first chamber and adapted to switch between conducting a positive pressure into the first chamber at large intake air quantities and at small and medium intake air quantities and low engine loads to open the intake air switching valve, and conducting an atmospheric pressure into the first chamber at small and medium intake air quantities and high engine loads to close the intake switching valve.

19. An internal combustion engine with a dual turbocharger system according to claim 18, and further comprising a positive pressure tank connected to a portion of the intake line downstream of the intake switching valve and upstream of a throttle valve, the three-way solenoid valve being connected to the positive pressure tank.

20. A control device for an internal combustion engine with a dual turbocharger system, comprising:

a multi-cylinder internal combustion engine with an air intake and at least one exhaust outlet, cylinders of the engine being grouped into two groups;

an exhaust manifold connected with the engine exhaust outlet, the exhaust manifold including a first portion connected to one group of the cylinders and a second portion connected to another group of the cylinders, the first portion and the second portion of the exhaust manifold communicating with each other by a connecting conduit;

a first turbocharger and a second turbocharger arranged in parallel with each other with respect to the engine, each including a turbine and a compressor driven by the turbine, the turbines being connected with the air intake of the engine and the compressors being connected with the exhaust outlet of the engine via the exhaust manifold;

an intake line including a first intake conduit located downstream of and connected with the first turbocharger compressor, a second intake conduit located downstream of and connected with the second turbocharger compressor, an intake connecting portion where the first intake conduit and the second intake conduit join, and an intake common conduit connecting the intake connecting portion and the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed in the second intake conduit downstream of the second turbocharger compressor, but upstream of the intake connecting portion and adapted to open and close the second intake conduit;

an exhaust switching valve installed downstream of the second turbocharger turbine in the second exhaust conduit and adapted to open and close the second exhaust conduit;

intake air quantity detecting means and engine load detecting means provided for the engine;

intake air quantity determining means for determining whether the current intake air quantity detected by the intake air quantity detecting means is at large intake air quantities or at small to medium intake air quantities;

engine load determining means for determining whether a current engine load detected by the engine load detecting means is at high engine loads or at low engine loads;

first valve operation control means for opening the intake switching valve and the exhaust switching valve when the intake air quantity determining means determines that the current intake air quantity is at large intake air quantities;

second valve operation control means for closing the intake switching valve and the exhaust switching valve when the intake air quantity determining means determines that the current intake air quantity is at small to medium intake air quantities and the engine load determining means determines that the current engine load is at high loads; and third valve operation control means for opening the intake switching valve and closing the exhaust switching valve when the intake air quantity determining means determines that the current intake air quantity is at small to medium intake air quantities and the engine load determining means determines that the current engine load is at low loads.

21. A control device according to claim 20, wherein the intake air quantity detecting means comprises a flow meter installed in an intake line of the engine.

22. A control device according to claim 20, wherein the engine load detecting means comprises an intake pressure detecting sensor installed in an intake line of the engine.

23. A control device according to claim 20, wherein the intake air quantity determining means, the engine load determining means, the first valve operation control means, the second valve operation control means, and the third valve operation control means comprise a programmed micro computer.

* * * * *